INVENTOR.
WILLIAM G. CORSON

Jan. 13, 1953 W. G. CORSON 2,624,915
VULCANIZING OR LIKE PRESS
Filed Jan. 28, 1949 5 Sheets-Sheet 2
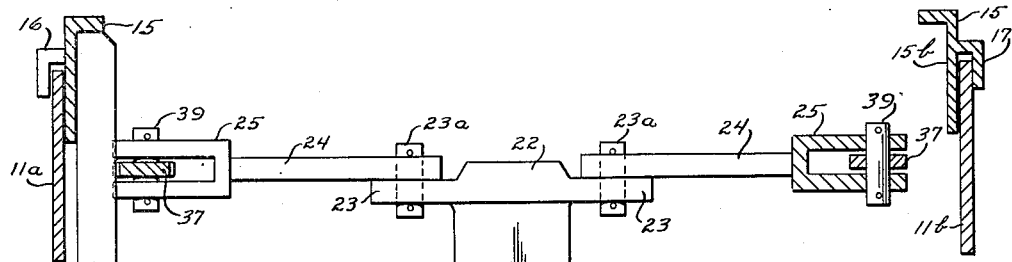
FIG. 2
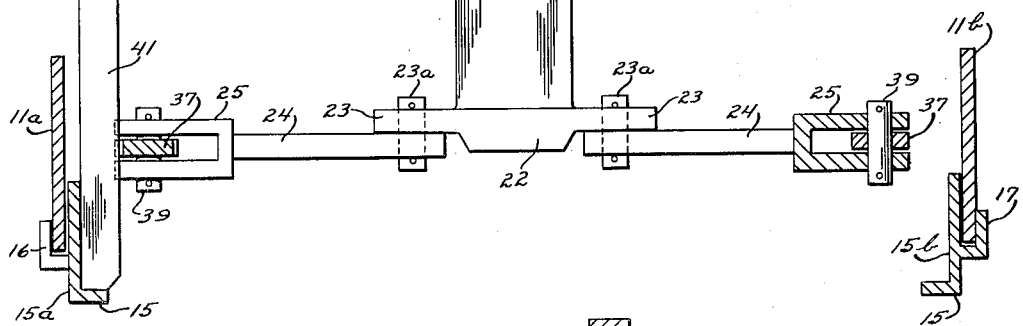
FIG. 3
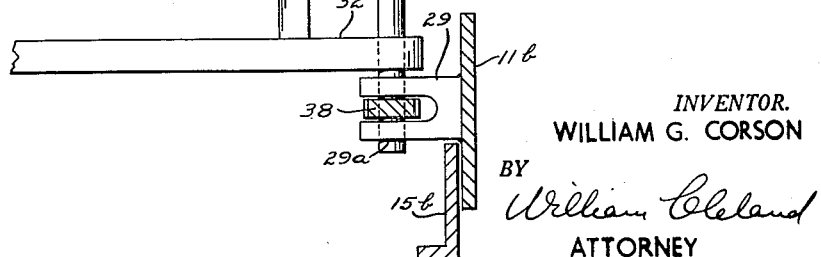
INVENTOR.
WILLIAM G. CORSON
BY
William Cleland
ATTORNEY Jan. 13, 1953 W. G. CORSON 2,624,915
VULCANIZING OR LIKE PRESS
Filed Jan. 28, 1949 5 Sheets-Sheet 3

INVENTOR.
WILLIAM G. CORSON
BY William Cleland
ATTORNEY

Jan. 13, 1953   W. G. CORSON   2,624,915
VULCANIZING OR LIKE PRESS
Filed Jan. 28, 1949   5 Sheets-Sheet 4

INVENTOR.
WILLIAM G. CORSON
BY
William Cleland
ATTORNEY

Jan. 13, 1953 W. G. CORSON 2,624,915
VULCANIZING OR LIKE PRESS
Filed Jan. 28, 1949 5 Sheets-Sheet 5
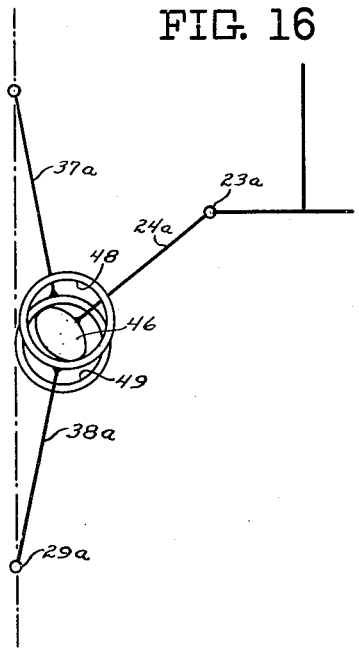
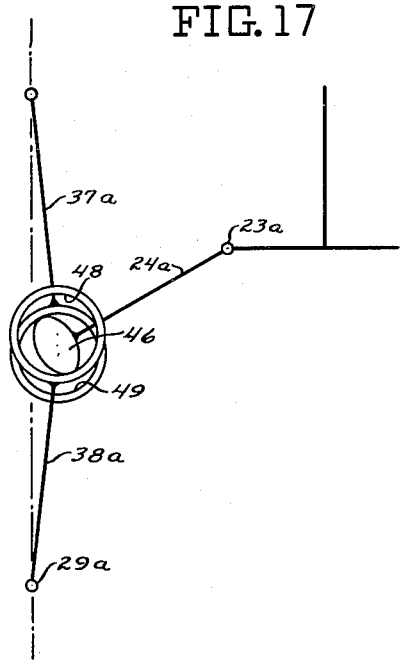
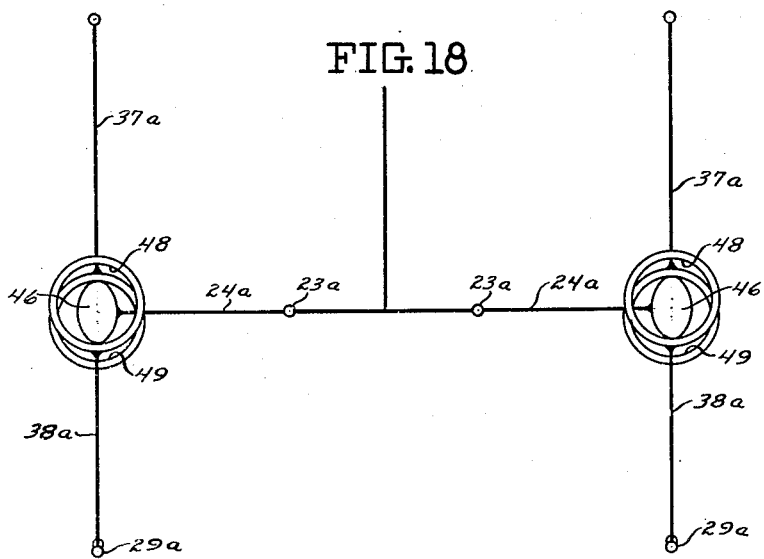
INVENTOR.
WILLIAM G. CORSON
BY William Cleland
ATTORNEY Patented Jan. 13, 1953

2,624,915

UNITED STATES PATENT OFFICE 2,624,915

VULCANIZING OR LIKE PRESS

William G. Corson, Akron, Ohio

Application January 28, 1949, Serial No. 73,350

13 Claims. (Cl. 18—16)

This invention relates to improvements in vulcanizing or like presses.

In the rubber industry the vulcanization of certain rubber articles has required the use of heavy pressure in a vulcanizing press, which for that reason usually required a powerful prime mover, such as a hydraulic ram, and correspondingly heavy associated parts moved thereby.

One object of the present invention is to provide an improved vulcanizing press, including a prime mover and toggle means operated thereby to open and close the press, and including improved means for furnishing a mechanical advantage to the toggle at a final pressure-applying stage thereof, whereby the press may be of generally light, economical construction and yet perform work which ordinarily requires heavy, expensive press structure.

Another object of the invention is to provide an improved press construction of the character described which readily lends itself to economical fabrication methods of production as compared with the usual press structures requiring expensive castings, machine work, etc.

These and other objects of the invention will be manifest from the following brief description and the accompanying drawings.

Of the accompanying drawings:

Figure 2 is a horizontal cross-section taken substantially on the line 2—2 of Figure 1.

Figure 3 is a fragmentary horizontal cross-section, taken substantially on the line 3—3 of Figure 1.

Figure 1:
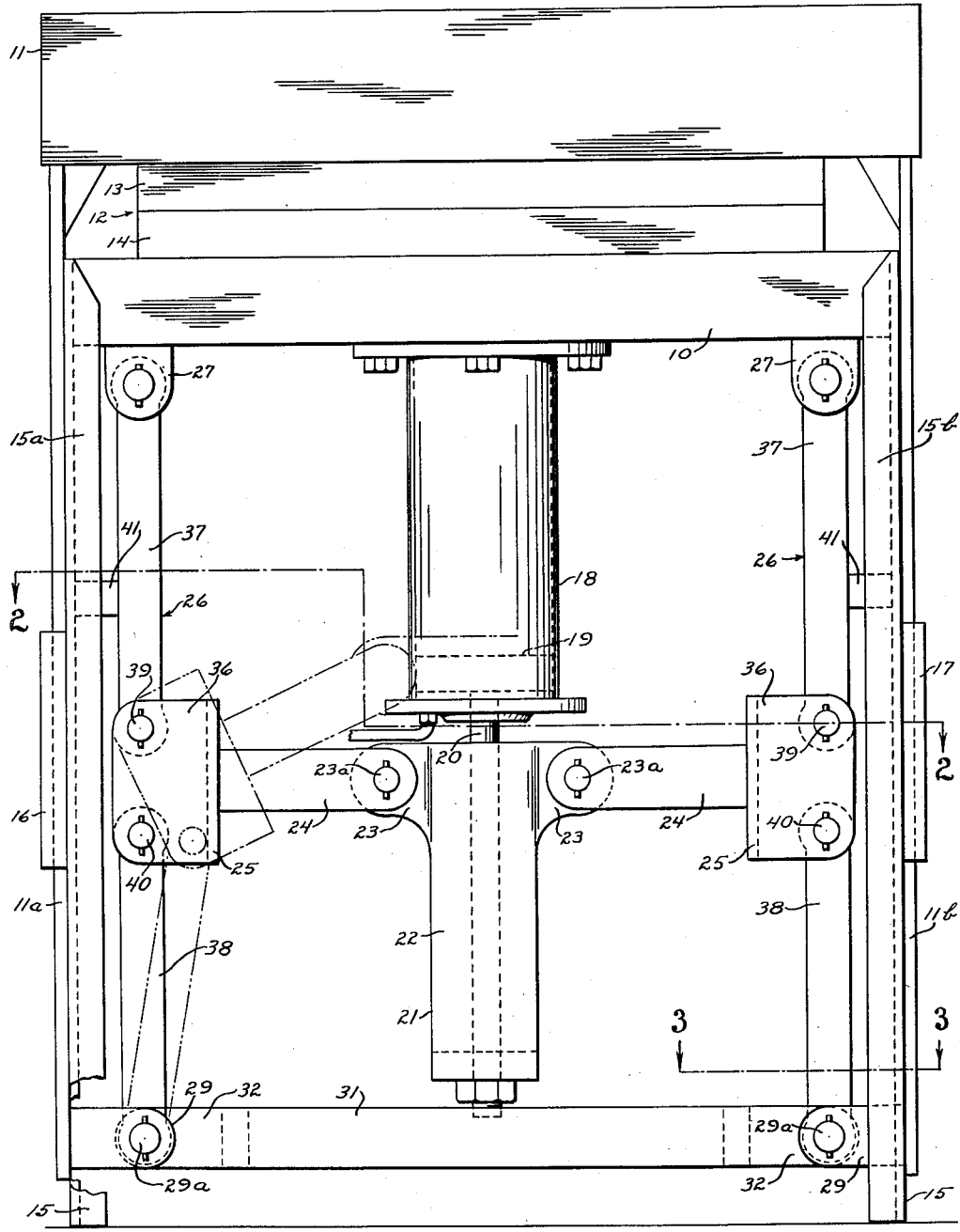
Figure 1 is a front elevation, partly broken away, of a vulcanizing press, embodying the features of the invention, in closed position.

Figures 11, 12, 13 and 14 are views taken on the lines 11—11, 12—12, 13—13 and 14—14 of Figures 7, 8, 9 and 10, respectively.

Figures 15, 16, 17 and 18 are diagrammatic views, corresponding to Figures 7, 8, 9 and 10, respectively, to illustrate more clearly the action of the toggle knee with respect to the other parts of the press.

Referring particularly to the form of the invention shown in Figures 1, 2, 3 and 4, there is illustrated a vulcanizing press including a relatively fixed lower platen member 10 and an upper platen member 11 which is vertically movable from and toward the same to open and close a sectional cavity mold 12, upper and lower sections 13 and 14 of which are secured to the platen members 10 and 11, respectively. The platen members 13 and 14 may be heated, as by steam from a suitable source (not shown), to provide requisite vulcanizing heat to mold 12.

The lower platen member 10, which is rectangular in shape, may be fixedly supported in horizontal position by means of two pairs of uprights or legs 15a, 15a and 15b, 15b of angular cross-section, secured at the upper ends thereof to the platen member, as by welding. The pairs of uprights 15a, 15a and 15b, 15b are arranged at opposite lateral sides of the press, and are provided with oppositely disposed, vertically extending guide channel portions 16, 16 and 17, 17, respectively, for vertically slidable reception of spaced pairs of plates 11a, 11a and 11b, 11b depending from opposite sides of the upper platen member 11.

For vertically moving the upper platen member 11, as described, there is fixed to the underside of lower platen 10, a cylinder 18 within which a piston 19 is reciprocable in longitudinal direction vertically of the press, as by means of air or other fluid pressure from a suitable source (not shown). To the lower end of the piston rod 20 is secured a U-shaped bracket 21, the spaced up-turned portions 22, 22 of which are adapted to extend at opposite sides of the piston cylinder in an up or press-open position thereof. At the upper ends of each portion 22 are oppositely laterally extending lugs 23, 23 to pins 23a on each of which is pivoted one end of a pitman 24, flexibly connected at its other end to the knee joint 25 of a toggle 26, there being four such toggles extended between pivot lugs 27, 27 on the underside of the lower platen member 10 and pivot lugs 29, 29 adjacent the lower ends of each of the four slide plates 11a, 11a and 11b, 11b. The bottom pivot centers 29a are maintained in a fixed laterally spaced relation with respect to each other in all positions of vertical movement of the plates 11a, 11b, with opening or closing of the press, as by means of a rigid brace 31, having spaced projections 32, 32 at opposite lateral sides thereof, pivoted on elongated pivot pins 33, 33 which also serve as the pivots for the lower ends of the toggles 26.

In the conventional toggle the pitman 24 would pivotally connect the upper and lower arms corresponding to toggle arms 37 and 38, respectively, at a common center. In order to provide sufficient power in such a construction, however, to apply requisite heavy pressure to mold sections 13 and 14 in closed vulcanizing position thereof, it would be necessary to supply a relatively heavy hydraulic ram in place of air cylinder 18, and as a consequence all other parts of the press would have to be proportionately heavier to take the strain. The relatively light press structure shown in the drawings is made possible by use of an improved knee joint 25 on each of the toggles 26.

Each toggle pitman 24 has at its outer end an integral bifurcated head 36 constituting a link to which the inner ends of upper and lower arms 37 and 38 of the toggle are pivoted to pins 39 and 40 at substantially spaced points, in an imaginary line which is at right angles to the pitman. In the mold-closed position of the press mechanism, shown in Figure 1, the toggles 26 are in fully straightened condition extending longitudinally in the direction of the vertical center of the press through the cylinder 18. Blocks 41 supported between the fixed supports 15 are engageable by the upper toggle arm 37 to limit the toggle against movement outwardly beyond the full-line straightened position of Figure 1. The action of the improved toggle will be best described in connection with a brief description of the operation of the press.

Figure 4:
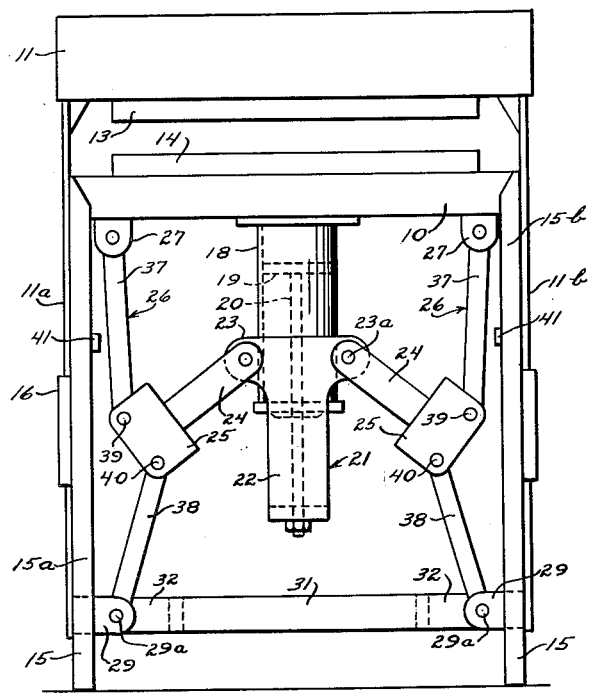
Figure 4 is a view similar to Figure 1, on a reduced scale, illustrating the press in an intermediate or partly open position.
Figure 6:
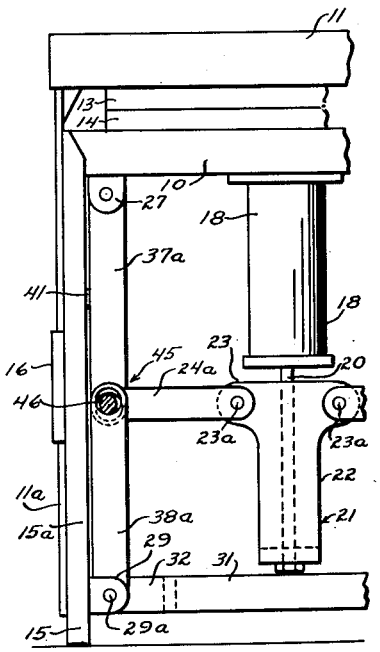
Figure 6 is a view similar to Figure 5, partly broken away, illustrating the modified press in closed position.
Figure 5:
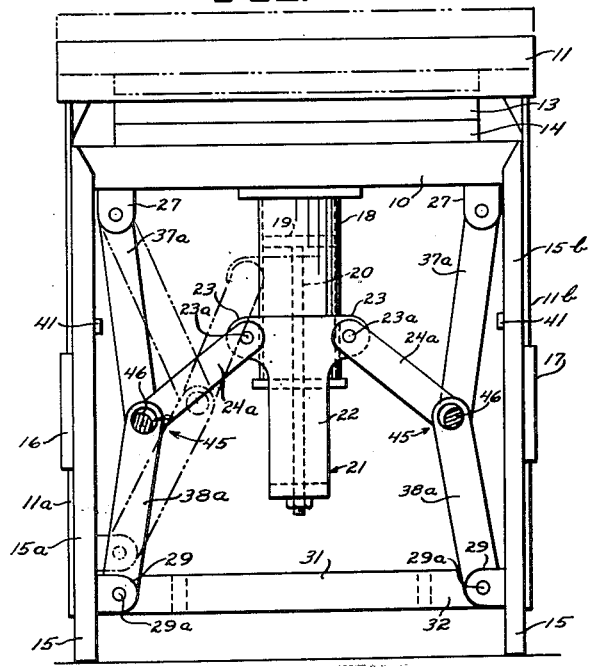
Figure 5 is a front elevation similar to Figure 4, illustrating a modified form of the invention.
Figure 7:
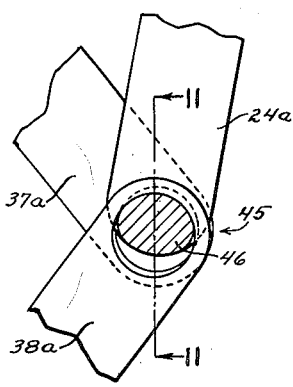
Figure 7 is a fragmentary view, partly in section, illustrating a toggle knee joint of the press of Figure 1 in a fully open position thereof corresponding to the chain-dotted position shown in part in said Figure 5.

In the operation of the press for vulcanizing rubber articles in the mold 12, the material to be formed into articles is placed in the molds while the press is in the open position shown in Figure 4, wherein the piston 19 has been urged upwardly, moving the bracket 21 up with it, and by changing the angular positions of the pitmans 24 has collapsed the toggles inwardly, the weight of the upper platen member 11 thereby being supported through the pitmans and the lower toggle arms 38. The press is now closed by operating the cylinder 18 to move bracket 21 downwardly and thereby to move the pitmans 24 from the full-line positions of Figure 4, to the mold-closed positions shown in full lines in Figure 1. Just before the piston 19 has made its full stroke, however, the mold sections will have moved into fully registering relationship and the upper toggle arms will have moved into stop engagement with the stops 41. Upon continued downward or closing movement of the piston 19, therefore, the pitmans 24 will be swung downwardly about the pivots 39, which are now relatively fixed, thereby to apply moments at the pivots 40, about said fixed pivots 39 and applying relatively great force to fully straighten and extend the same, the increased force being transmitted through the lower toggle arms, the vertical slide plates 11a, 11a and 11b, 11b, and the upper platen 11, to the mold sections 13 and 14. Thus, it may be readily calculated that the force applied for the final extending movement of the toggle arms in said fully straightened conditions thereof, that is the vertical force applied to each pin 40, will be a number of times that applied vertically to the pins 23a. The resulting mechanical advantage may, of course, be varied as desired. With the use of an arrangement as shown a very light press may be utilized to vulcanize rubber articles with requisite pressure which is ordinarily only possible by use of heavy hydraulically operated platen presses.

In the modified form of the invention shown in Figures 5 to 18, all parts are the same as previously described except with reference to the knee joint construction 45 of the toggles, and all like parts, therefore, will be indicated by like numerals unless otherwise noted.

Figure 8:
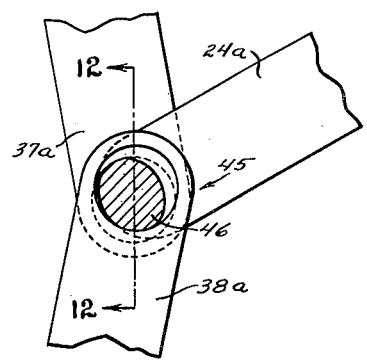
Figure 8 is a view similar to Figure 7, illustrating the toggle parts in an intermediate, partly closed position of the press.
Figure 9:
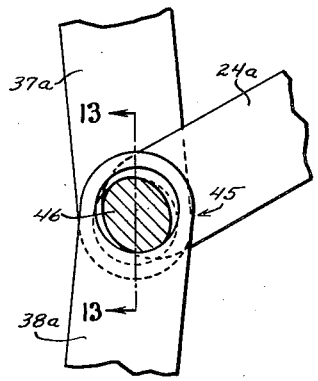
Figure 9 is a similar view illustrating the toggle parts in another intermediate position of the press more nearly approaching closed position thereof.
Figure 10:
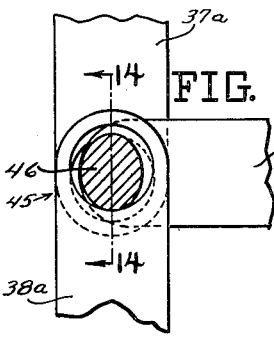
Figure 10 is a similar view illustrating the toggle parts in a fully closed position of the press.
Figures 11, 12, 13:
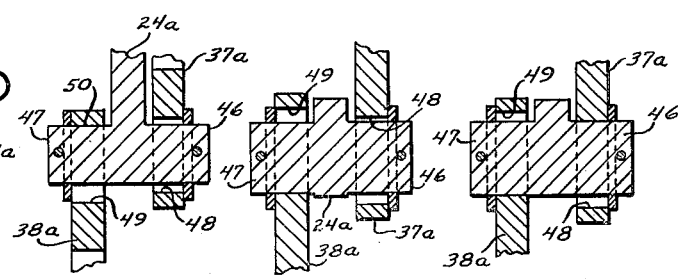
Figure 14:
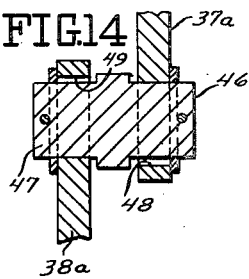
Figure 15:
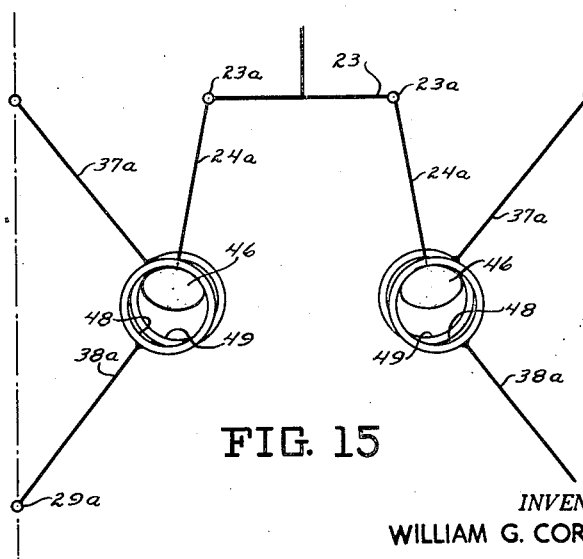

The modified toggle knee joint 45 is best shown in Figures 5 to 14. In each toggle unit a pitman 24a has provided on the outer end thereof, integral oppositely disposed cam projections 46 and 47 received in apertures 48 and 49 of upper and lower toggle arms 37a and 38a, respectively. The cam projections are ovate in cross-section and somewhat smaller in dimension across the major axes than the diameters of the apertures 48 and 49. The ovate projections are so located on the pitman, that is with the major axes of the cams substantially at right angles to the longitudinal center line of the pitman, that in the fully open position of the press the upper arm 37a will be relatively loose on its cam projection 46 while the upper edge portion of the aperture 49 of lower arm 38a will be engaged with an upwardly presented flattened or broad side 50 of cam projection 47 (see Figures 7 and 11) to support a proportion of the weight of the upper platen member 11, through arm 38a, and plates 11a. In operation of the modified press just described, downward press-closing movement of piston 20 swings the pitmans 24a from the chain-dotted press-open position thereof, shown in Figure 5, first to the full line positions of Figure 5 in which the mold sections 13 and 14 are in registry, but in which toggles 45 are not fully straightened. As soon as the mold has moved into initial registry the lower toggle arm 38a of each toggle is momentarily free and the cam projections react on the inner ends of both arms of the toggle in the manner of a simple toggle to straighten the same, as shown in Figures 8, 9 and 10 and the corresponding diagrammatic views of Figures 16, 17 and 18. Figures 11 to 14, which are cross-sections through Figures 7 to 10, respectively, illustrate further the relative positions of the cam projections in the toggle arm apertures. In Figure 9 (and corresponding Figure 17) the cam projections are turning to present the major axes thereof in vertical direction, as shown in Figure 10 (and corresponding Figure 18), thereby to apply heavy toggle-extending force between the opposite outer edge portions of apertures 48 and 49 of the upper and lower toggle arms 37a and 38a, respectively, which is transmitted to the mold sections.

Thus, by use of the cam structure described, it is possible to apply to the closed mold a restraining force which may be many times greater than the downward force of the piston cylinder.

Other modifications of the invention may be resorted to without departing from the spirit thereof or the scope of the appended claims.

What is claimed is:

1. Apparatus of the character described, comprising a relatively movable member and a relatively fixed element spaced therefrom, supporting means for mounting said member and element to be relatively movable longitudinally from and toward each other, a prime mover including a movable part, toggle means between said member and element, said toggle means including at least one pair of longitudinally extending toggle arms pivoted at opposite outer ends to said member and element, and a pitman pivotally connected at opposite ends to said movable part and to the inner ends of said arms, respectively, said prime mover being operable to move said movable part and thereby move said toggle arms to adjacent a straightened condition thereof in which said member and element are positioned relatively of each other in opposed pressure-applying condition, stop means being provided to limit movement of the toggle arm pivoted to said fixed element whereby it is also relatively fixed as against further pivoted movement by said pitman, the pivotal connection between the inner ends of said toggle arms and said pitman including expansion means operable therebetween whereby further movement of said pitman will fully straighten said toggle arms and simultaneously extend the arms relatively of each other longitudinally and thereby increase said opposed pressure of said member and element.

2. Apparatus of the character described, comprising a relatively movable member and a relatively fixed element spaced therefrom, supporting means for mounting said member and element to be relatively movable longitudinally from and toward each other, a prime mover including a movable part, toggle means between said member and element, said toggle means including at least one pair of longitudinally extending toggle arms pivoted at opposite outer ends to said member and element, and a pitman pivotally connected at opposite ends to said movable part and to the inner ends of said arms, respectively, said prime mover being operable to move said movable part and thereby move said toggle arms to adjacent a straightened condition thereof in which said member and element are positioned relatively of each other in opposed pressure-applying condition, stop means being provided to limit movement of the toggle arm pivoted to said fixed element whereby it is also relatively fixed as against movement lengthwise thereof, the pivotal connection between the inner ends of said toggle arms and said pitman including expansion means operable by full straightening of said toggle arms simultaneously to move the inner pivot points of said arms relatively of each other to increase said opposed pressure of said member and element.

3. Apparatus of the character described, comprising a relatively movable member and a relatively fixed element spaced therefrom, supporting means for mounting said member and element to be relatively movable longitudinally from and toward each other, a prime mover including a movable part, toggle means between said member and element, said toggle means including at least one pair of longitudinally extending toggle arms pivoted at opposite outer ends to said member and element, and a pitman pivotally connected at opposite ends to said movable part and to the inner ends of said arms, respectively, said prime mover being operable to move said movable part and thereby move said toggle arms to adjacent a straightened condition thereof in which said member and element are positioned relatively of each other in opposed pressure-applying condition and in which the toggle arm pivoted to said fixed element is also relatively fixed as against further pivoted movement by said pitman, stop means being provided for preventing said further pivoted movement of said toggle arm pivoted to said fixed element the pivotal connection between the inner ends of said toggle arms and said pitman including cam means operable therebetween whereby further movement of said pitman will fully straighten said toggle arms and simultaneously extend the arms relatively of each other longitudinally and thereby increase said opposed pressure of said member and element.

4. Apparatus of the character described, comprising a relatively movable member and a relatively fixed element spaced therefrom, supporting means for mounting said member and element to be relatively movable longitudinally from and toward each other, a prime mover, and toggle means between said member and element, said toggle means including at least one pair of longitudinally extending toggle arms pivoted at opposite outer ends to said member and element, and a link pivoted at spaced points to the inner ends of said arms, the centers of the outer and inner pivots of said arms being substantially aligned when the toggle arms are in a straightened pressure-applying position, said prime mover including a movable part, said link having a rigid extension therefrom connected to said movable part, operation of said movable part being adapted through said link to move said toggle arms to adjacent straightened condition thereof in which said member and element are positioned relatively of each other in opposed pressure-applying condition, means being provided for limiting movement of one said toggle arm beyond a said straightened condition thereof further movement of said movable part being effective to apply a moment to said inner pivot of the other said arm about the inner pivot of said limited arm and thereby move said other arm to a said straightened condition thereof to apply increased pressure to said member and element.

5. Apparatus of the character described, comprising a relatively movable element and a relatively fixed member, supporting means for mounting said element to be relatively movable toward and from said relatively fixed member, a prime mover, toggle means between said element and member, said toggle means including a pair of arms pivoted at opposite outer ends to said member and element and an intermediate link pivoted at spaced points to the opposed inner ends of said pair of arms, the centers of said outer and inner pivots of said arms being substantially aligned when the toggle is in straightened full pressure-applying position, said prime mover including a part reciprocable in the direction longitudinally of said straightened toggle, said link having a rigid extension therefrom connected to said reciprocable part, operation of said reciprocable part in one said direction being adapted to move said toggle arms thereof toward said straightened condition to move said element and member relatively apart, stop means being provided to limit said pivotal movement of said toggle arm of said member beyond said straightened condition of the arm, movement of said extension toward full straightened position of said arms being effective to apply a moment to the inner pivot of the toggle arm of said element about the inner pivot of the so limited toggle arm and thereby to further straighten said arms to apply increased pressure.

6. A press comprising relatively movable platen members, spaced supports for supporting one of said members in relatively fixed position, spaced extensions on the other platen member to extend in longitudinal directions, guide means on said extensions and supports whereby said other platen member is movable relatively of said fixed platen member in said longitudinal direction, a plurality of toggles each including a pair of arms flexibly connected at inner ends thereof and pivoted at the outer ends thereof to said fixed platen member and to one of said extensions to extend in said longitudinal direction in a straightened condition, a prime mover centrally of said plurality of toggles and having a part reciprocable in said longitudinal direction, a pitman for each said toggle pivoted at one end to said reciprocable part and attached at the other end to said flexible connection of the respective toggle, said reciprocable part being reciprocable to swing said pitmans through various angular positions and thereby move the toggles from and toward said straightened conditions thereof to move said platen members from and toward pressure-applying positions, said flexible connection of each said toggle including expansion means operable therein whereby angular movement of the respective said pitman toward the fully straightened condition of the toggle will extend said arms thereof in said longitudinal direction and thereby to apply increased opposing pressure to said platen members, a stop means being provided to limit swinging movement of the toggle arms of the fixed platen member beyond said straightened condition.

7. A press as set forth in claim 6, said flexible connection and expansion means of each toggle comprising a link pivoted at spaced points to the inner ends of the toggle arms, said link being an integral part of said pitman.

8. A press as set forth in claim 6, said flexible connection and expansion means of each toggle comprising a cam device operable between said pitman and said toggles whereby angular movement of said pitman will separate the toggle arms in said longitudinal direction.

9. A press as set forth in claim 6, said flexible connection and expansion means of each toggle comprising opposite cam members integral with said pitman and engaging said toggle members through oversized apertures provided in the inner ends thereof, said cam members in the collapsed position of the arms supporting said movable platen member, the pitman in moving angularly toward the straightened position of the toggle thereby turning the cam members to apply opposing pressure to opposite outer edge portions of said oversized apertures to urge the arms apart in said longitudinal direction.

10. Apparatus as set forth in claim 3, said cam means comprising opposite cam members integral with said pitman and engaging said toggle members through oversized apertures in inner ends thereof, said cam members in the collapsed position of the toggle arms supporting the weight of said relatively movable member, said pitman in moving angularly toward the straightened position of the toggle thereby turning the cam members to apply opposing pressure to opposite outer edge portions of said oversized apertures to urge the arms apart in said extending movement thereof.

11. Apparatus as set forth in claim 3, including stop means whereby movement of said toggle arms beyond said straightened condition thereof is prevented.

12. Apparatus as set forth in claim 6, including stop means whereby movement of said toggles beyond the straightened positions thereof is prevented.

13. Apparatus as set forth in claim 6, including a rigid cross-brace connecting between the pivotal points of the outer end of the toggle arms.

WILLIAM G. CORSON.

REFERENCES CITED

The following references are of record in the file of this patent:

UNITED STATES PATENTS

| Number | Name | Date |
|---|---|---|
| 73,610 | Jordan | Jan. 21, 1868 |
| 596,398 | Ellis | Dec. 28, 1897 |
| 1,327,710 | Hemstreet | Jan. 13, 1920 |
| 1,333,648 | Wennberg | Mar. 16, 1920 |
| 1,646,872 | Prouty | Oct. 25, 1927 |
| 2,334,082 | Gates | Nov. 9, 1943 |
| 2,395,100 | Caron | Feb. 19, 1946 |

FOREIGN PATENTS

| Number | Country | Date |
|---|---|---|
| 7,305 | Great Britain | 1888 |